United States Patent

Herndon

[15] 3,641,260

[45] Feb. 8, 1972

[54] ELECTRONIC RASTER ROTATION SYSTEM FOR TELEVISION

[72] Inventor: John W. Herndon, Orlando, Fla.

[73] Assignee: The United States of America as represented by the Secretary of the Navy

[22] Filed: Aug. 21, 1970

[21] Appl. No.: 65,835

[52] U.S. Cl. ............................178/7.7, 178/DIG. 35, 315/24

[51] Int. Cl. ............................................................H04n 3/22

[58] Field of Search .................315/24; 178/DIG. 35, 7.5 SE, 178/6.8, 7.7

[56] References Cited

UNITED STATES PATENTS

| | | | |
|---|---|---|---|
| 3,379,833 | 4/1968 | Hecker et al. | 178/7.7 |
| 3,463,962 | 8/1969 | Bazin | 315/24 |

*Primary Examiner*—Robert L. Richardson

*Assistant Examiner*—Richard K. Eckert, Jr.

*Attorney*—Richard S. Sciascia and John W. Pease

[57] ABSTRACT

An electronic circuit used in a television system in conjunction with a television camera tube having electronic beam deflection means wherein the electronic circuit comprises a pair of mixing circuits actuated from the normal output signals of horizontal and vertical ramp generators and develops through adjustable zero centered potentiometer means, phase inverter means and capacitive coupling means composite output signals for application to the beam deflection means of the camera tube, each composite signal being variable in amplitude and phase by adjustment of said potentiometer means to achieve raster rotation and thereby simulate roll attitudes of an object being viewed by the camera tube, a further aspect of the invention residing in the utilization of two camera tubes and a video mixing circuit for providing a combined output signal for simulating relative motion of two pictures taken by the respective camera tubes.

5 Claims, 13 Drawing Figures

JOHN W. HERNDON
INVENTOR

By John W. Pease

Attorney

JOHN W. HERNDON
INVENTOR

By

Attorney

JOHN W. HERNDON
INVENTOR

By John W. Pease

Attorney

JOHN W. HERNDON
INVENTOR
By
John W. Pease
Attorney

JOHN W. HERNDON
INVENTOR

By [signature]

Attorney

ELECTRONIC RASTER ROTATION SYSTEM FOR TELEVISION

STATEMENT OF GOVERNMENT INTEREST

The invention described herein may be manufactured and used by or for the Government of the United Stated of America for governmental purposes without the payment of any royalties thereon or therefor.

BACKGROUND OF THE INVENTION

This invention relates to the field of simulation wherein it is desired to simulate variation in attitude of an object being viewed by a camera tube, such as a vidicon, without the need to alter the attitude of the viewed object itself or the camera tube. One effect commonly required is the simulation of roll of submarines, of aircraft, or ships. Conventionally, the simulation of roll is effected by servo controlled mechanical means. One such method is to mount the camera tube so that it can be rotated mechanically and controlled by a servo system. Another method is to provide a rotatable deflection assembly on the camera tube which would also be a mechanical device controlled by a servo system.

The above-described conventional methods have the disadvantage of being bulky, of adding possible interference fields and of subjecting the camera tube assembly to mechanical vibration.

SUMMARY OF THE INVENTION

The subject invention provides electronic means comprising capacitor coupled mixing circuits including phase inverter and zero control gang operated potentiometer means for providing composite wave forms of variable phase and amplitude for application to the electron beam deflection circuitry of a camera tube to cause the raster to be generated at normal horizontal attitude or at angles other than normal horizontal attitude when roll simulation is desired. The invention further contemplates the provision of two camera tubes such that relative rotation between two scenes such as the scene of an aircraft carrier on water and the scene of an aircraft cockpit may be rolled one with respect to the other to simulate a pilot making normal left and right banking maneuvers in a landing approach. Docking of a ship may also be simulated in the same manner.

DESCRIPTION OF THE PREFERRED EMBODIMENT

Figure 1:
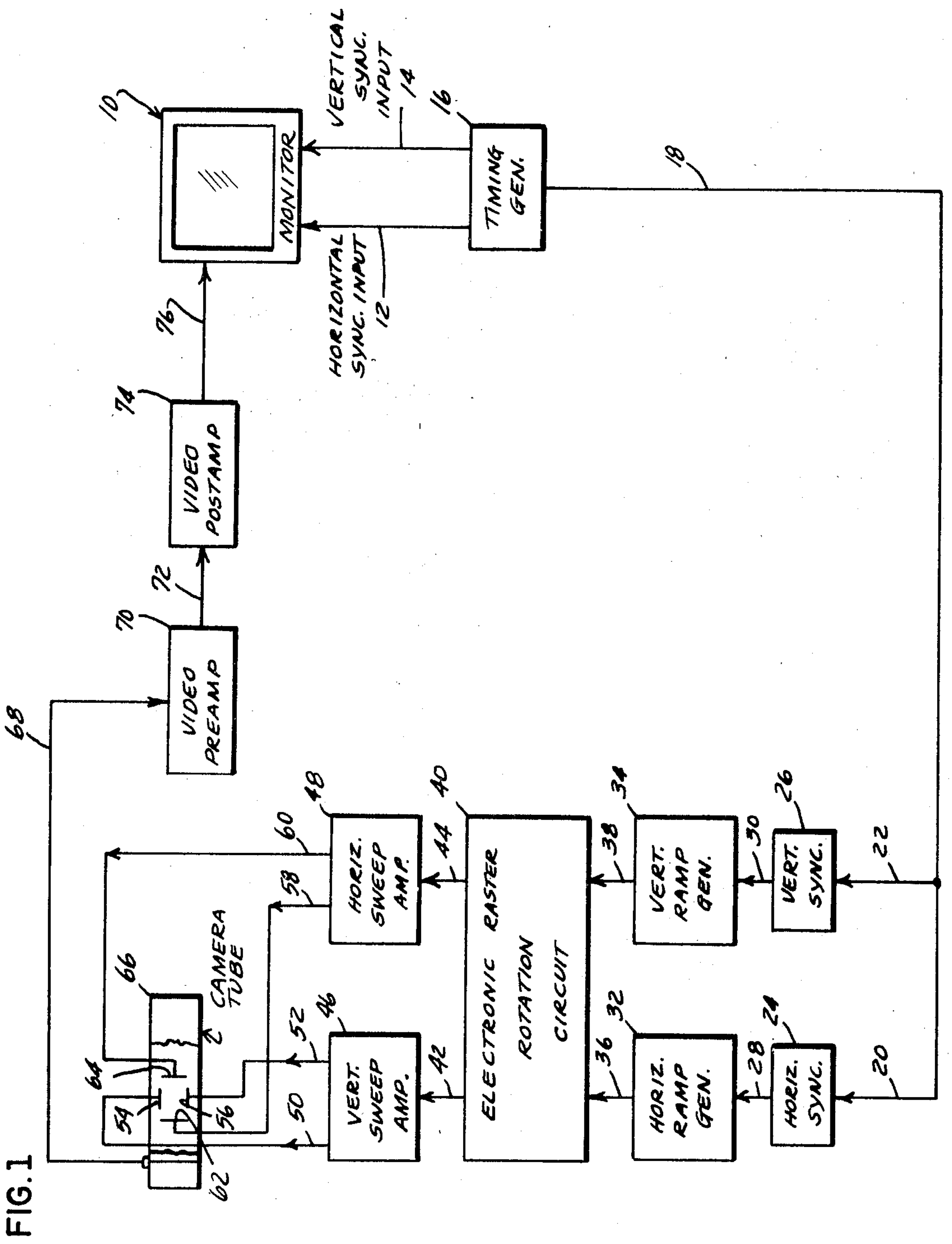
FIG. 1 is a block diagram showing a closed television circuit incorporating applicant's invention.

Referring to FIG. 1 of the drawing, there is shown therein a closed circuit television system incorporating the invention. The system comprises a monitor 10 supplied with horizontal and vertical sync inputs on respective lines 12 and 14 from a timing generator 16. Connected to the timing generator by lines 18, 20 and 22 are provided horizontal and vertical syncs 24 and 26 which supply inputs on lines 28 and 30 respectively to horizontal and vertical ramp generators 32 and 34, which in turn apply input signals on lines 36 and 38 to a novel electronic raster rotation circuit 40 shown in detail in FIG. 2. The outputs of circuit 40, which comprise composite wave forms of adjustably variable phase and amplitude as will be described hereinafter, are passed on lines 42 and 44 through vertical sweep amplifier 46 and horizontal sweep amplifier 48 and applied through lines 50 and 52 to control the vertical beam deflection means 54 and 56 and on lines 58 and 60 to control the horizontal beam deflection means 62 and 64 of a camera tube 66. The output of the camera tube 66 is connected by line 68, video preamplifier 70, line 72, video post amplifier 64 and line 76 to monitor 10 to provide the video electrical signal to the monitor.

Figure 2:
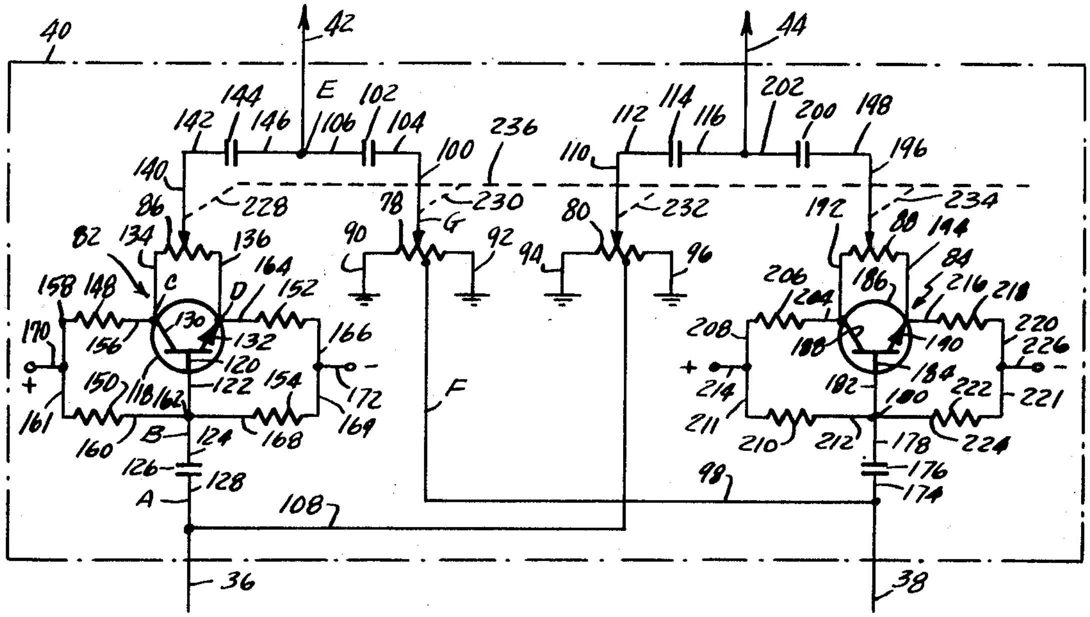
FIG. 2 is a detailed circuit diagram of the electronic raster rotation circuit shown in block form in FIG. 1.

Referring to FIG. 2, there is shown therein one suitable circuit for providing composite wave forms of variable phase and amplitude for application to the electron beam deflection circuitry of the camera tube 66. As shown in FIG. 2, the circuit 40 comprises a pair of mixing circuits, each having one leg with potentiometer means, as for example potentiometers 78 and 80, for amplitude variation and another leg in each circuit phase inverter means, indicated generally at 82 and 84, and additional potentiometer means 86 and 88 for varying phase in the composite output signals of the two mixing circuits.

As shown in FIG. 2, the potentiometer 78 and 80 are zero control for maximum output at zero setting. Potentiometer 78 has its opposite ends connected by 90 and 92 to grounds indicated. Potentiometer 80 has its opposite ends connected by lines 94 and 96 to ground indicated. Input to potentiometer 78 is provided on line 98 connected to the output line 38 of the vertical ramp generator 34. The wiper arm 100 of potentiometer 78 is connected through a capacitor 102 on lines 104 and 106 to input line 42 connected to the vertical sweep amplifier. In a similar manner, an electrical signal from the horizontal ramp generator is connected from line 36, a line 108, a wiper arm 110, a line 112, a capacitor 114 and a line 116 to the input line 44 of the horizontal sweep amplifier.

In the variable phase angle leg connecting lines 36 and 42, the phase inverter 82 comprises a transistor 118 having a base 120 connected by line 122, line 124, capacitor 126 and line 128 to the horizontal ramp generator output line 36. The collector 130 and emitter 132 are connected by lines 134 and 136 to opposite ends of the potentiometer 86. The wiper 140 of potentiometer 86 is connected by a line 142, a capacitor 144 and a line 146 to the output line 42. The phase inverter 82 is provided with voltage balancing means to provide equal voltage amplitude, positive and negative, at the ends of the potentiometer 86 and thus provide zero voltage output when the sweep arm 140 is at zero centered position. In this respect suitable values of resistors 148, 150, 152 and 154 are selected. Resistor 148 is connected by lines 156, 158 and 170 from collector 130 to a source of positive voltage indicated. Resistor 150 is connected by lines 160, 161 and 170 between said positive voltage source and a common point 162 connected to the transistor base 120 through line 122. Resistor 152 is connected from the transistor emitter 132 to a source of negative voltage indicated by lines 164, 166 and 172. Resistor 154 is connected between common point 162 and the negative voltage source indicated by lines 168, 169 and 172.

In the variable phase leg incorporating the phase inverter 84 and connecting input and output lines 38 and 44 similar circuitry is provided. Thus line 38 is connected through a line 174, a capacitor 176, a line 178, a common point 180, a line 182, the base 184 of a transistor 186, its collector 188 and emitter 190, lines 192 and 194, potentiometer 88, its wiping arm 196, a line 198, a capacitor 200 and a line 202 to output line 44. The balancing circuits comprise line 204, resistor 206, line 208, line 211, resistor 210 and line 212, lines 208 and 211 being connected by a line 214 to a positive voltage source indicated. The opposite balancing circuit comprises a line 216, resistor 218, a line 220, a line 221, a resistor 222, a line 224 connected to the common point 180, and a line 226 connecting lines 220 and 221 to a source of negative voltage indicated.

Figure 3:
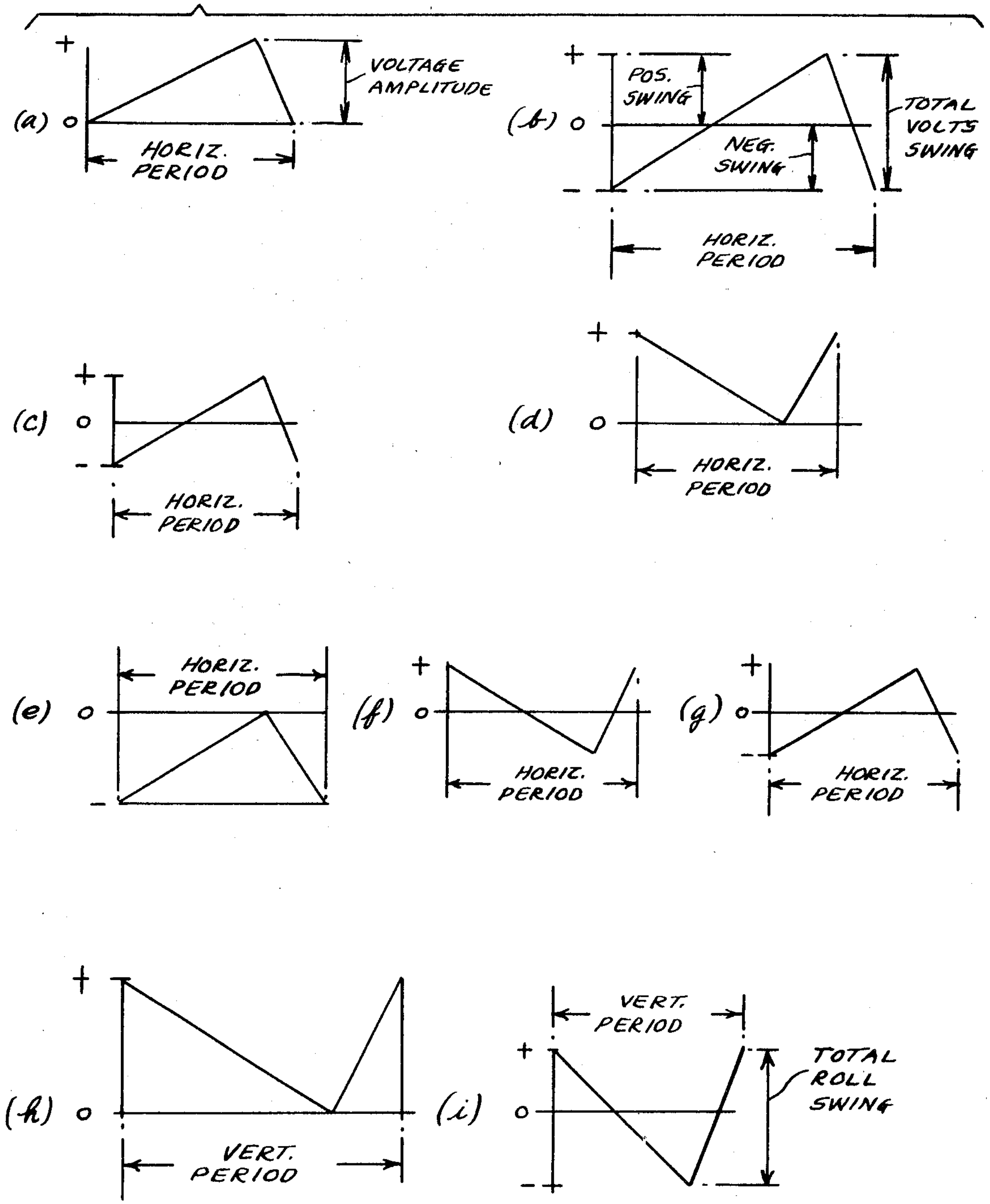
FIG. 3 illustrates the several waveforms found at various points in the electronic raster rotation circuit shown in FIG. 1.

For a better understanding of the function and operation of the electronic raster rotation circuit of FIG. 2, a discussion of the same in relation to the curves of FIG. 3 should be helpful. Referring to FIGS. 2 and 3, circuits 82 and 84 are phase inverters. Circuit 82 receives at point A a ramp function of voltage from the horizontal ramp generator. This is a positive function curve as indicated by curve (*a*) of FIG. 3. When this positive function signal is transferred across capacitor 126, the ramp function swings about zero voltage level as indicated by curve (*b*) of FIG. 3. Phase inverter 82 when provided with an input wave form, faithfully reproduces it in two places in the output side, that is at the collector and the emitter. One of the two output wave forms, however, is 180° out of phase with the other. Thus the input wave form at point B, FIG. 2, takes the form of curve (*c*) of FIG. 3. The output at C, FIG. 2, is inverted as shown at curve (*d*), FIG. 3, and the output at point D, FIG. 2, is oriented as at the point B and is in the form indicated at curve (*e*), FIG. 3.

Since these wave forms are equal but opposite in phase (gain and circuit component values are selected to assure this condition), when the wave forms are applied simultaneously to potentiometer 86, the voltage resultant at the electrical center of the potentiometer 86 will be zero volts and phase angle correction output to line 42 will be zero. When the wiper arm 140 of the potentiometer 86 is moved toward its end connected to line 136, a voltage on line 140 will result and will be shaped as shown in curve (*d*) of FIG. 3. Its amplitude will increase in value depending upon how far the wiper arm is moved toward its end connected to line 136 which is at the voltage of the transistor collector 130. Similarly, when the wiper arm is moved in the opposite direction toward line 138 connected to the transistor emitter, the resultant voltage will be as shown in curve (*e*) of FIG. 3, and its amplitude will increase as the wiper arm is moved in the direction of line 138.

The voltage wave form at E having passed through the capacitor 144 again swings about zero. Thus, when the arm 140 is close to line 136, its curve is as shown at curve (*f*), FIG. 3. When the arm is near line 138 the wave form is as shown at (*g*), FIG. 3, and when the arm 140 is electrically centered, the resultant output wave is zero.

Considering now the amplitude potentiometer 78 (FIG. 2), at point F the wave form is as shown at curve (*h*), FIG. 3. At point G maximum voltage amplitude is obtained when the wiper arm 100 is electrically centered. Amplitude decreases when the wiper arm 100 is moved in either direction toward ground. This arrangement is provided in order that the potentiometers 86 and 78 can be gang operated, as indicated by dotted lines 228, 230, 232, 234 and 236. The wave form at G in passing through capacitor 102 becomes centered about zero to take the form indicated at curve (*i*), FIG. 3, and combines at point E, FIG. 2, with the wave form from potentiometer 86 to form the resultant output electrical signal on line 42 as the vertical beam deflection signal. The other mixing circuit involving the phase inverter 84 and potentiometer s 80 and 88 operates in the same manner to provide on line 44 the horizontal beam deflection signal.

Figure 4:
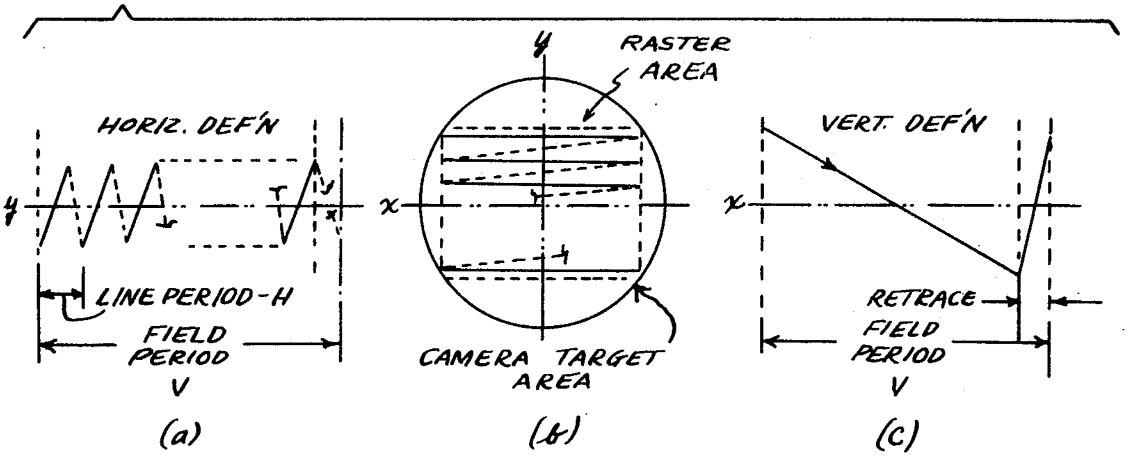
FIGS. 4(*a*), (*b*), and (*c*); 5(*a*), (*b*) and (*c*); and 6(*a*), (*b*) and (*c*) depict the wave forms and raster area respectively of normal horizontal attitude, left roll and right roll effect attainable by applicant's invention.
Figure 5:
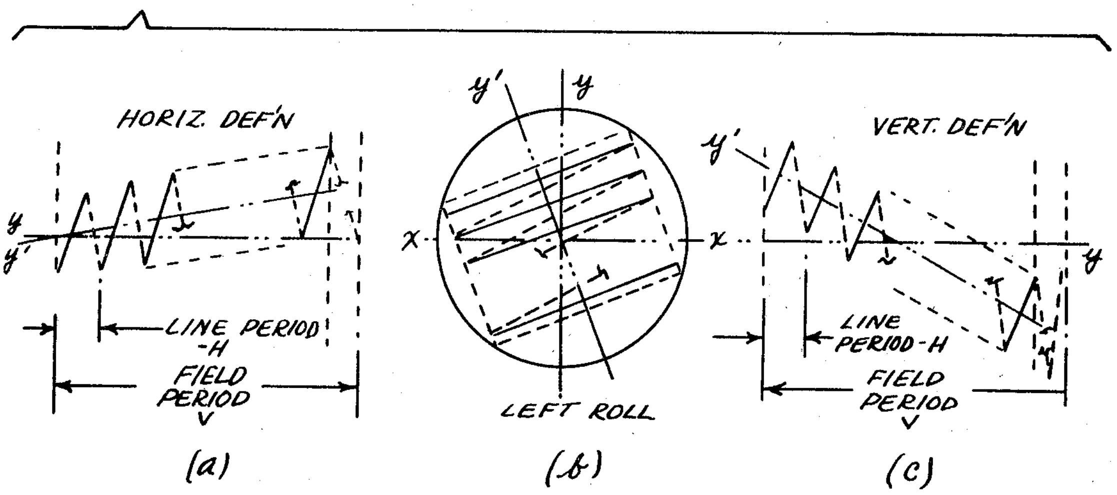
Figure 6:
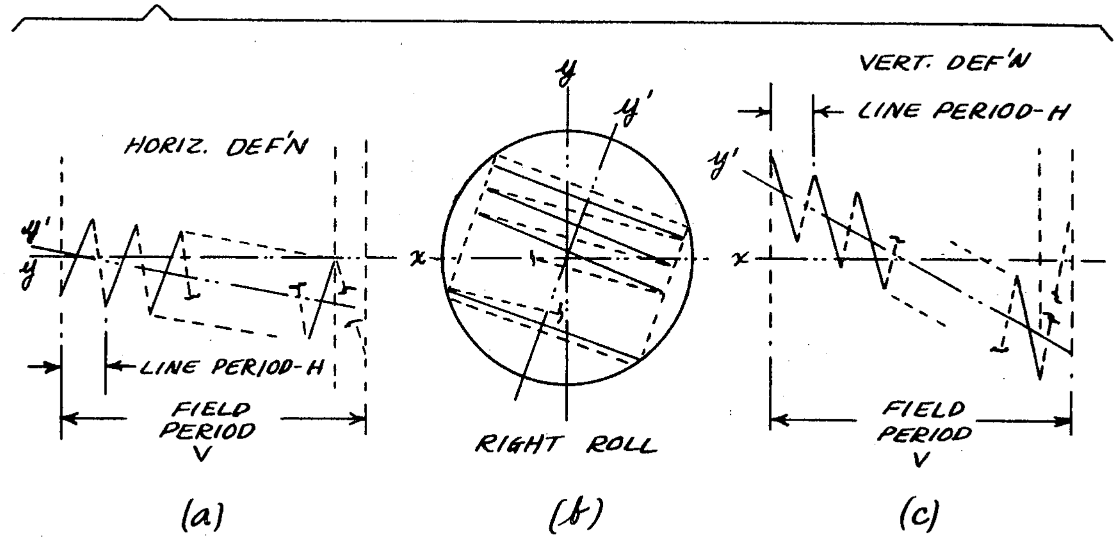

FIGS. 4, 5 and 6 of the drawing show the wave forms of horizontal and vertical deflection obtained through operation of the electronic raster rotation circuit 40 and the resultant raster area attitudes. Thus, FIG. 4(*b*) shows a normal horizontal raster resulting from horizontal deflection wave input shown in FIG. 4(*a*) and vertical deflection input shown in FIG. 4(*c*). This is the normal mode of operation of the camera tube where the potentiometer sweep arms are at electrically zero position affording no correction to the normal ramp generator signals.

FIG. 5 illustrates raster rotation to the left (counterclockwise). Thus, for the horizontal deflection component, the normal horizontal line ramp function is offset on a positive-going ramp function which has a period equal to the field period. This is illustrated in FIG. 5(*a*). As a result of these two functions each line is displaced to the right by an amount $\Delta x$, as determined by the desired degree of rotation. Similarly, the vertical deflection component is achieved by two ramp functions, one positive-going ramp at the line rate is impressed on a normal negative-going vertical ramp function. The composite vertical deflection result in each line being deflected upward during its horizontal deflection period and stepped downward during the retrace period to a point below the start of the previous line by an amount $\Delta y$. This is illustrated in FIG. 5(*c*). FIG. 5(*b*) illustrates the resultant raster rotated to the left.

For rotation of the raster to the right (clockwise), composite wave forms are generated in the relationships shown in FIG. 6. For the horizontal deflection component the normal horizontal line function is impressed on a negative-going offset ramp function which has a period equal to the field period, as shown in FIG. 6(*a*). As a result each line is displaced to the left by an amount $\Delta x$. For the vertical deflection component, a negative-going function at the horizontal rate is impressed on the normal negative-going vertical ramp function, as shown in FIG. 6(*c*). As a result each line is deflected downward during its horizontal deflection period and stepped upward during the retrace period to a point below the start of the previous line by an amount $\Delta y$. FIG. 6(*b*) illustrates the resultant raster rotated to the right.

Thus, by operation of the gang connected potentiometers the resultant scene viewed by the camera tube can be held at normal horizontal attitude or rolled to the left or right in desired degree.

It is to be understood that while the invention has been described in the environment of a closed circuit television system, it can be used in other systems such as a television transmitter and receiver system by placing the raster rotation means 40 in the circuit controlling a camera tube (not shown) which supplies the video signal to the T.V. transmitter (not shown).

In a further aspect of the invention, it is contemplated to employ two or more camera tubes, one or more of which is controlled by an electric raster rotation circuit to develop and display simulation of relative movement between the scenes taken by the several camera tubes.

Figure 7:
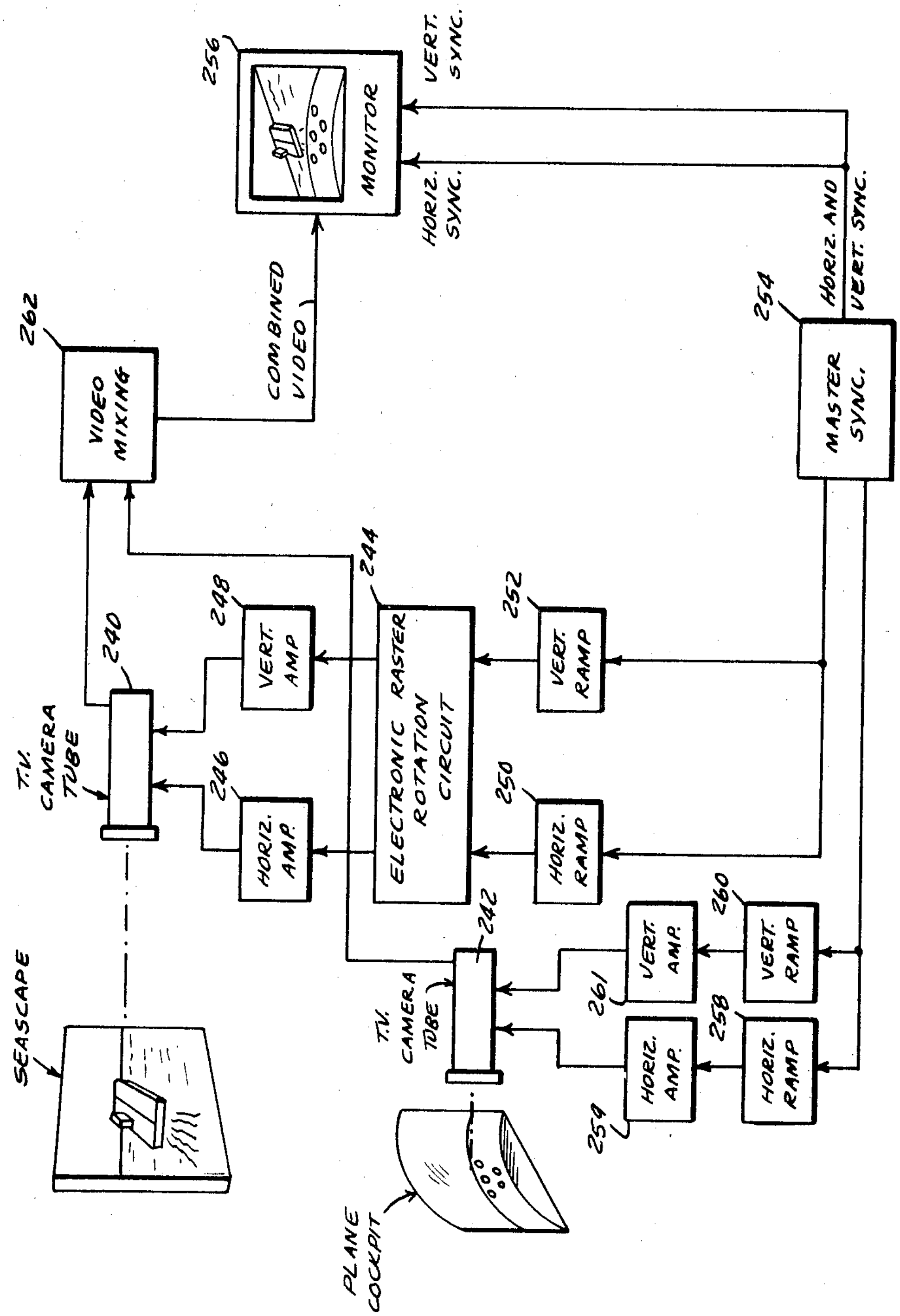
FIG. 7 is a block diagram illustrating the employment of two camera tubes for producing the effect of relative motion between two scenes taken by the respective camera tubes, one being the scene of an aircraft carrier on water and the other being a portion of the cockpit of the aircraft.

One such system is shown in FIG. 7, wherein a camera tube 240 is positioned to view a seascape including a carrier (indicated) and a camera tube 242 positioned to view the portion of a plane cockpit (indicated). In this arrangement the camera tube 240 is controlled through an electronic raster rotation circuit 244 connected through horizontal and vertical amplifiers 246 and 248 and fed by horizontal and vertical ramp generators 250 and 252 as indicated from a master sync 254 such that the seascape may be positioned in attitude as desired on the monitor 256.

The camera tube 242 is employed in a conventional actuating circuit including horizontal and vertical ramp generators 258 and 260 fed from the master sync 254 to pass horizontal and vertical beam deflection signals through respective horizontal and vertical amplifiers 259 and 261 to the camera tube 242 to produce the plane cockpit image in normal horizontal attitude on the monitor 256. A video mixing circuit 262 is employed to provide the combined video signal to the monitor 256. Such a combination as shown in FIG. 7 enables the simulation of left and right bank or normal head on approach to the carrier (indicated). Details of operation of the circuitry are the same as previously described hereinabove.

The system described herein results in a capability to rotate the camera tube raster by electronic means smoothly and continuously, clockwise or counterclockwise, such that rolling motion is simulated. The system may be linked to the controls of a training device (not shown) so that a displayed scene rolls in accordance with the desired simulation of the device. The system also may be programmed to simulate random roll of a vessel (not shown) on rough waves (not shown). The device may also be used for special novelty effects in commercial television programming.

What is claimed is:

1. In a television system having a television camera tube with horizontal and vertical beam deflection means, the beam deflection means being normally activated by electrical signal inputs from associated horizontal and vertical ramp generators to develop a raster at normal horizontal attitude, the improvement comprising:

a. an adjustable electronic raster rotation means for causing the raster to be generated at normal horizontal attitude or selectivity at angles other than normal horizontal attitude to simulate roll motion of an object viewed by said camera;

b. said electronic means comprising two mixing circuits, one connected to receive input signals from the ramp generators and pass a composite output signal to the vertical beam deflector means, the other connected to receive input signals from the ramp generators and pass a composite output signal to the horizontal beam deflector means;

c. said mixing circuits each having one leg connected to one of said ramp generators with potentiometer means connected at zero midpoint setting for maximum voltage amplitude output at said zero setting to selectively vary the amplitude of the composite signal output and a second leg connected to the other of said ramp generators with capacitor, phase inverter and zero centered potentiometer means for selectively varying the phase angle of the composite signal output; and d. means for gang operation of said zero centered potentiometer means to simultaneously vary in phase and amplitude the composite signal inputs to said horizontal and vertical beam deflection circuits of said camera tube.

2. Apparatus according to claim 1, a. said mixing circuits having additional capacitor means connecting each of said potentiometer means to said respective horizontal and vertical beam deflection circuits, and b. said phase inverter means being connected through said first mentioned capacitor means to said other ramp generator and through said additional capacitor means to its associated beam deflection circuit.

3. Apparatus according to claim 1, a. said phase inverter comprising a transistor having positive and negative balancing circuits connected respectively from the collector of said transistor and the base thereof to a source of positive voltage, and from the emitter of said transistor and the base thereof to a source of negative voltage, b. said potentiometer means in said second legs having one end thereof connected to said transistor collector and its other end connected to said transmitter emitter, c. said balancing circuits including resistors selected to balance the positive and negative voltages in amplitude at said transistor emitter and collector points.

4. Apparatus according to claim 2, a. said phase inverter comprising a transistor having positive and negative balancing circuits connected respectively from the collector of said transistor and the base thereof to a source of positive voltage and from the emitter of said transistor and the base thereof to a source of negative voltage, b. said potentiometer means in said second legs having one end thereof connected to said transistor collector and its other end connected to said transmitter emitter, c. said balancing circuits including resistors selected to balance the positive and negative voltages in amplitude at said transistor emitter and collector points.

5. Apparatus according to claim 1, including a. a second camera tube for providing an output signal to develop a raster at normal horizontal attitude, b. a video mixing circuit connected to receive video input signals from both said camera tubes and for providing a combined output signal to a T.V. monitor such that relative rotation of the two pictures taken with said two camera tubes can be simultaneously displayed.

* * * * *